May 22, 1962 I. V. K. HOTT 3,035,662
UNIVERSAL HINGED RAIL FRAME CONTACT LIFT
Filed Nov. 23, 1959 3 Sheets-Sheet 1
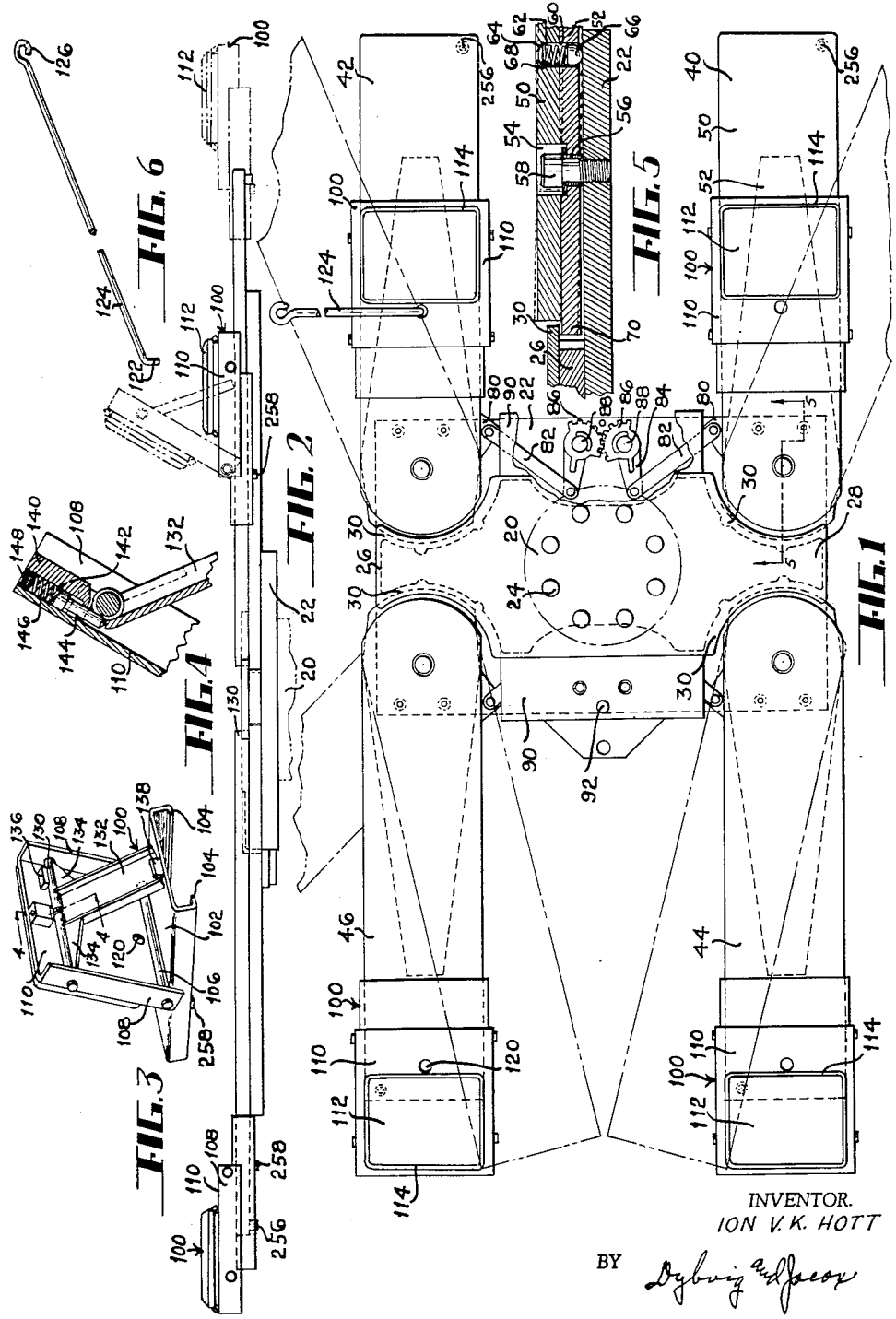
INVENTOR.
ION V. K. HOTT
BY
HIS ATTORNEYS

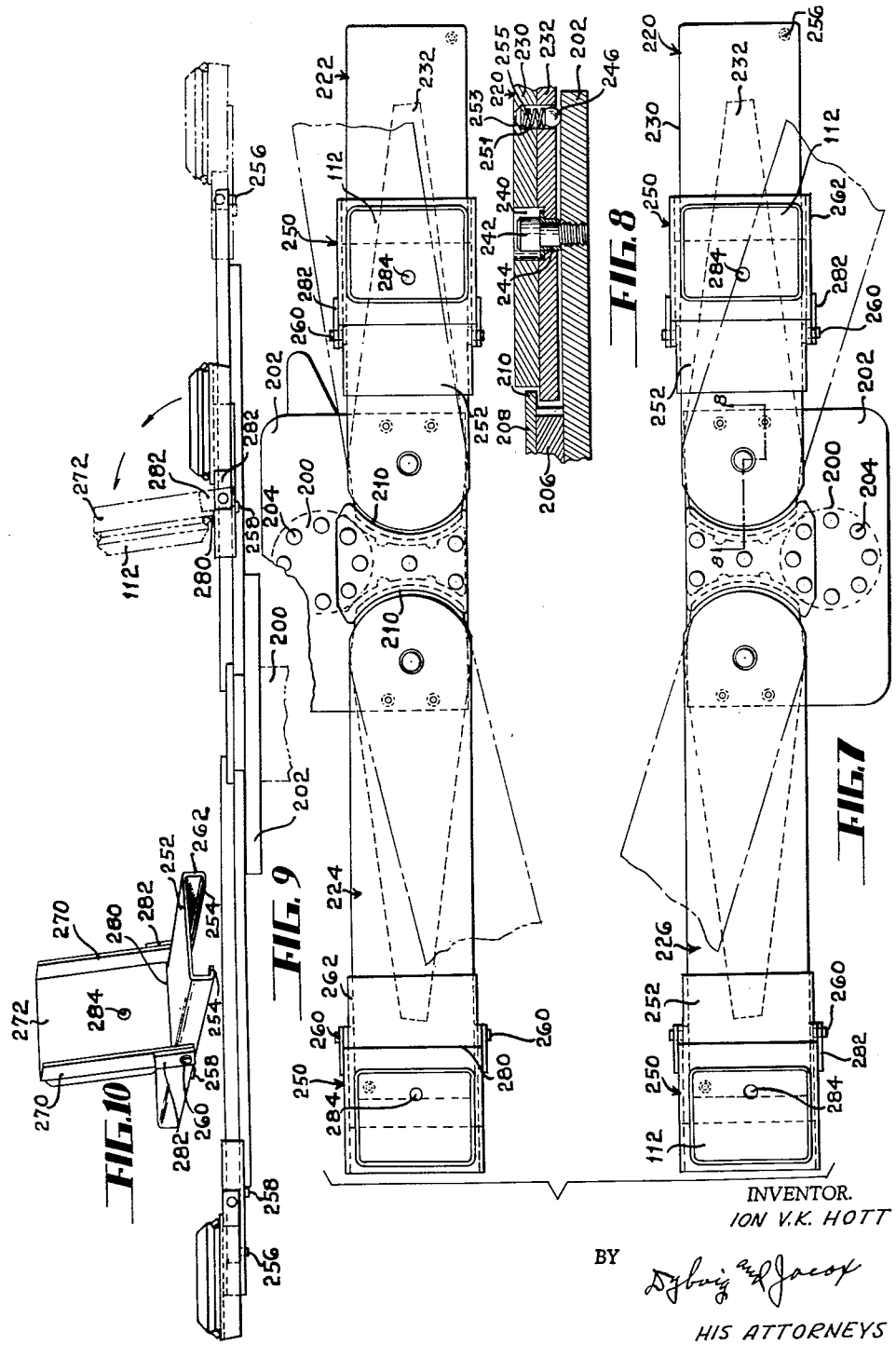

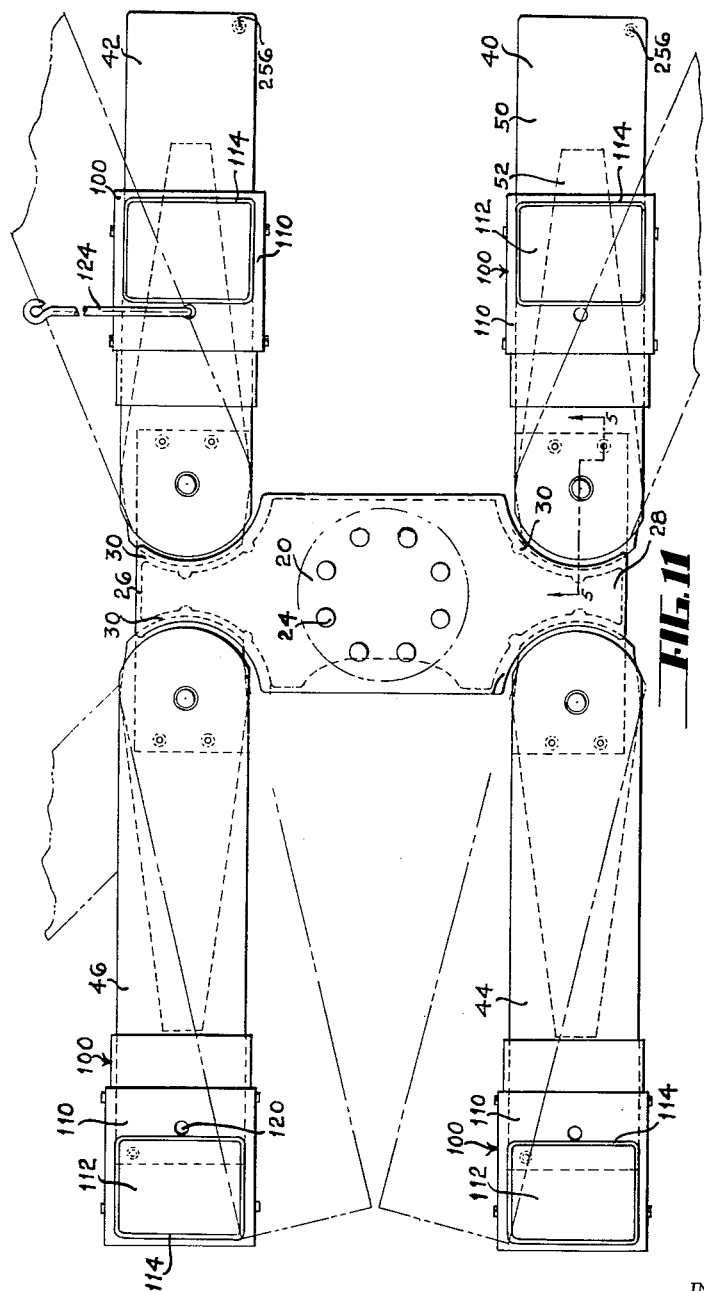

United States Patent Office 3,035,662
Patented May 22, 1962

3,035,662
UNIVERSAL HINGED RAIL FRAME
CONTACT LIFT
Ion V. K. Hott, Dayton, Ohio, assignor to The Joyce-Cridland Company, a corporation of Ohio
Filed Nov. 23, 1959, Ser. No. 854,827
5 Claims. (Cl. 187—8.75)

This invention pertains to a universal hinged rail for use in lifting motor vehicles and more particularly to a frame contact lift, although not necessarily so limited.

This application is a continuation-in-part of my copending application Serial No. 696,256, filed November 13, 1957, for Universal Hinged Rail Frame Contact Lift, now abandoned.

The development of automobiles and service equipment for servicing automobiles has led to numerous changes. It used to be common practice to run the wheels of a motor vehicle upon a pair of parallel rails and then lift the motor vehicle while supported upon the wheels. When the motor vehicle is supported upon its own wheels, the springs are held in tension, tires or wheels cannot be removed and replaced and the frame structure supporting the motor vehicle is oftentimes in the way.

It has been recognized that the use of conventional rails mounted in fixed relation upon a lift for a motor vehicle does not meet all requirements. That being the case, attempts have been made wherein adjustable brackets are mounted near the ends of the conventional rails of the supporting frame for the motor vehicle, so as to accommodate various widths of automobiles. However, as far as known, none of these devices has been extensively used and none of these devices meets the exacting demands of the public.

In order to suspend the wheels to release the tension of the springs, to thereby enable better lubrication, frame contact lifts have been developed. Unfortunately, the frame contact lift that meets the requirements for raising a Cadillac may not meet the requirements for raising some of the smaller automobiles, especially some of the foreign makes. Furthermore, the frames of the automobiles are not all alike. On some automobiles practically a three point suspension may be desired, namely, to support the front end near the center of the automobile and to support the rear end in close proximity to the rear wheels. In other makes of automobiles, the portion of the frame to be engaged may consist of a very limited area and the rails for supporting such a frame must, of necessity, be so arranged as to engage these particular supporting areas.

An object of this invention is to provide a universal frame contact lift wherein the rails extend from a support near the center post or posts used in raising the motor vehicle, two rails extending forwardly and two rails extending rearwardly. In the single post lift, the rails extending either to the front or to the rear are adjusted in unison, the front rails being so interconnected that when one rail is moved, the companion rail is moved an equal angular distance in the opposite direction, the rearwardly extending rails also being adjusted in unison, these rails being interconnected so that it is merely necessary to adjust one rail in order to affect adjustment of both rails.

Another object of this invention is to provide a suspension for the rails such that the rails are mounted upon roller bearings when adjusted manually without supporting a motor vehicle, the roller bearings being resiliently mounted so as to transfer the force exerted by the weight of the motor vehicle to positive contacts.

Another object of this invention is to provide a suspension for the rails which permits limited initial movement of the rails before the roller bearings that are resiliently mounted are caused to move, so as to store up sufficient inertia to overcome static friction before the roller bearings are driven by the movement of the rails. This has been accomplished by placing the roller bearings in apertures on one side of the rails, the roller bearings resting upon a support, the diameter of the apertures for the roller bearings being larger than the roller bearings so that even though the roller bearings support the weight of the rail through a suitable spring, limited movement of the rail may be made without driving the roller bearing. This permits the overcoming of static friction tending to resist movement of the rail before the roller bearings are driven.

Another object of this invention is to provide a dual support for the rails, one of which may be referred to as a floating support for supporting the rails without a load thereon, so that the rails may be easily adjusted transversely without a great amount of friction. When the load is added to the rails, the support for the rails is transferred from the floating support to a rigid support for the rails.

Other objects and advantages reside in the construction of pars, the combination thereof, the method of manufacture and the mode of operation, as will become more apparent from the following description.

In the drawings,

FIGURE 1 is a top plan view of a single post universal lift, with parts broken away.

FIGURE 2 is a side elevational view of the lift shown in FIGURE 1.

FIGURE 3 is a detail view of a riser block used as a support on an elevation higher than the elevation of the rails.

FIGURE 4 is a fragmentary, cross sectional view, taken substantially on the line 4—4 of FIGURE 3.

FIGURE 5 is a cross sectional view, taken substantially on the line 5—5 of FIGURE 1.

FIGURE 6 is a side elevational view of a rod or handle used in manipulating the lift shown in FIGURE 1.

FIGURE 7 is a top plan view of a modification, disclosing a two post lift.

FIGURE 8 is a cross sectional view, taken substantially on the line 8—8 of FIGURE 7.

FIGURE 9 is a side elevational view of the preferred modification shown in FIGURE 7.

FIGURE 10 discloses a modified load supporting block.

FIGURE 11 is a top plan view of a single post universal lift similar to FIGURE 1, omitting therefrom the mechanism for swinging pairs of rails in unison.

Referring to the drawings, the reference character 20 designates a single post lift hydraulically driven in a vertical direction to raise and lower a motor vehicle, as is well known to those skilled in the art. A plate 22 is secured to the top of the post by a plurality of bolts 24. A second plate 26, provided with arcuate cut-away portions, is fixedly secured to and superimposed upon the plate 22. A third plate 28 overlies the plate 26. This plate 28 is also provided with arcuate cut-away portions. The arcuate portions of the plate 28 overhang the arcuate portions of the plate 26, so as to provide projecting ledges 30. Each projecting ledge 30 consists of a radial arc generated from the pivotal axis about which the rails 40, 42, 44 and 46 are swingable.

In the preferred embodiment, four rails or arms for supporting the frame of the motor vehicle have been shown. The two arms 40 and 42 will be referred to as the forwardly extending arms and the two arms 44 and 46 will be referred to as the rearwardly extending arms. The direction of the arms, with respect to the motor vehicle, is merely a matter of choice and its designation has been chosen merely for convenience in explaining the operation of the device. The arms 40, 42, 44 and 46 are mounted in an identical manner, the only difference being that arms 40 and 44 may be referred to as the right arms or rails, and the arms 42 and 46 as the left arms or rails. That being the case, the mounting of only one arm will be described in detail, in that the mounting of the other arms will be mere duplication.

The arm 40 consists of a rail member 50 which, in reality, is a flat steel plate. This is reinforced by a tapering and underlying reinforcing plate member 52. The two members 50 and 52 being attached together function in a manner similar to a lever when supporting the load.

Two types of support have been provided for each of the arms or rails 40, one of which may be referred to as a floating support and the other as a rigid support. The floating support will now be described.

As may best be seen by referring to FIGURE 5, the plate member 50 is provided with a hole 54 and the plate member 52 has been provided with a hole that is of lesser diameter. A bushing 56 has been mounted in the hole in the plate member 52. A screw or bolt 58 extends through the plate member 52 and the bushing 56 to hold the plate member 52 and with it the rail member 50 being attached pivotally thereto upon the plate 22. The screw 58 functions as a pivot, about which the arm 40 may swing. The plate 52 has also been provided with a pair of apertures 60 and the rail or plate member 50 has been provided with a pair of apertures 62, each having a shoulder 64. A compression spring 68 and a roller bearing 66 are mounted in each of the apertures 60 and 62. This provides a triangular support for the rails when the rails are not loaded, in that the rails are supported upon the roller bearings 66 and the springs 68 together with the screw or bolt 58. It is to be noted that the diameter of the holes 60 is larger than the diameter of the roller bearings 66. This is to permit limited movement of the rail without the edge of the holes 60 coming in immediate contact with the roller bearings 66. In other words, the rail may be moved laterally while suspended upon the rolls or balls 66 and moved without coming in contact with the balls or bearings 66, so as to overcome the static friction, that is, the force required to initiate movement of the rail. The resiliency of the springs 68 is such that these springs are not strong enough to support a load upon the rails, that is, when a motor vehicle is raised by the rails, the springs will compress. When this takes place, a lip 70, projecting rearwardly or towards the center of the lift, engages the ledge 30 and the plate member 52 engages the outer margin of the plate 22. The inner end consists of a radial arc generated from the pivotal axis about the center of the bolt 56. Likewise, the inner end of the rail member 50 consists of an arc generated from the pivotal axis about the center of the bolt 56. In FIGURE 5, the arms 40, consisting of rail member 50 and plate member 52, have been shown in the full line position, that is, the floating position. In the dot-dash line position, these plates have been shown when loaded, that is, when supporting the weight of a motor vehicle.

Means have been provided for connecting the two front rails so as to move in unison, but in opposite directions, so that it is merely necessary to move one of the rails to accomplish the movement of the other rail extending forwardly in the same magnitude, but in the opposite direction. The rear rails have been connected likewise. The means for driving the two rails simultaneously when one of them is actuated will now be described.

The rails 40 and 42 have each been provided with a bracket 80 fixedly attached to the rails. These brackets are pivotally attached to a link 82, the two links being identical. The opposite end of the links 82 have been connected to an arm 84 integral with a gear sector 86, the two gear sectors being identical, so that as one rail 40 is moved, the gears 86 through the arms 84 and the links 82 will drive the other rail in the opposite direction. If, for example, the rail 40 is spread outwardly from the full line position shown in FIGURE 1 into the dot-dash position shown in this figure, the rail 42 will be moved outwardly from the full line position into the dot-dash position shown in this figure. The pivots 88 for the gear sectors 86 are fixedly mounted in the plate 22. The gear sectors 86, the arms 84 and the links 82 have been mounted in a plane with the plate member 26. A cover member, which may be an angle-shaped member 90, overlies the gear sectors, so as to provide a shield for these gear sectors. It may be seen, by referring to the cover 90 in association with the rearwardly directed rails, that this cover is provided with a finger hole 92 which facilitates the removal of the cover 90.

A frame supporting assembly 100 is adjustably mounted upon each of the rails. Each support assembly 100 is slidably mounted upon its rail, the length of each support assembly being at least one-third the length of the rail on which it is slidably supported. These assemblies 100 may be slidable to an extended position with a substantial portion of the length of the assembly extending beyond the outer end of the rail, as clearly shown in dotted lines in FIGURE 6. The assembly 100 consists of a channel-shaped base member 102 provided with re-entrant flanges 104. The reentrant flanges 104 underlie rail member 50. A pin or rod 106 is welded to the top of the channel member 102 and projects beyond the margin of the channel member. The portion of the pin projecting beyond the margins of the channel member 102 has pivotally mounted thereon flanges 108 of a channel member 110. The flanges 108 may lie on the side of the channel member 102 when in the position shown in FIGURES 1 and 2. In order to prevent injury, scratching and marring of the parts supported upon the rails 40, 42, 44 and 46, each of the channel members 110 has superimposed thereon a rubber pad 112. This rubber pad 112 may be secured in position in any suitable manner, as for example by being bonded in the pocket in a rectangular metallic frame 114.

Each of the channel members 110 may be provided with an aperture 120 adapted to receive a hook 122 of a rod 124 provided with a hand grip portion 126. This rod may be used to slide the assembly 100 lengthwise on the rails 40, 42, 44 and 46. It may also be used in adjusting the rails angularly, as for example, from the full line position shown in FIGURE 1 into the dot-dash position by merely exerting a pull or a push upon the rod 124. Furthermore, this rod or handle may be used in rotating or adjusting the channel member 110 and the parts associated therewith from the flat position shown in FIGURES 1 and 2 in full lines into an inclined position like that shown in dotted lines in FIGURE 2 and more clearly shown in FIGURES 3 and 4.

By referring to FIGURE 3, it can readily be seen that the channel member 110 pivotally supports a rod 130 that is mounted for rotation in apertures in the flanges 108. This rod 130 has connected thereto a brace or bracket member 132 mounted for swinging movement with the rod 130. Gusset plates 134 are used in bracing the bracket member 132 with respect to the rod 130. A lug 136 is welded to the rod 130 and limits the angular displacement of the bracket member 132 with respect to the channel member 110, so that bracket member 132 can only swing outwardly from the channel member 110 a predetermined distance as determined by the position of the lug 136 on the rod 130. A suitable stop 138 is welded to the top of the channel member 102 so as to provide a stop against which the lower end of the bracket member 132 is seated when the assembly is in the raised position, as shown in FIGURE 3.

A housing 140 is welded to the end wall of the channel member 110. This housing is provided with an aperture 142, having mounted therein a plunger 144 spring urged into downward position by a compression spring 146 held in position by an externally threaded nut 148. The end of plunger 144 pushes downwardly on the end of the brace 132, as best seen in FIGURE 4, tending to rotate the brace 132 in a counterclockwise direction, as viewed in FIGURE 4, so that when the channel member 110 is raised from the horizontal position into the inclined position, as shown in FIGURE 3, the bracket 132 immediately flips in a counterclockwise direction in readiness for supporting the channel member 110 in the inclined position. It can readily be seen that the channel member 110, together with the brace 132, provides a triangular support. This is used in contacting frames where there happens to be some type of an obstruction, such that the frame cannot rest upon the rubber pads 112 when the channel member 110 is in the horizontal position, as shown in FIGURE 1. In other words, if it is found necessary to provide a support for a portion of the frame of a motor vehicle in a raised position with respect to the rails 40, 42, 44 and 46, the channel member may be raised by means of the handle or rod 124, so as to provide a raised support for that portion of the frame.

When the lift is lowered and the motor vehicle removed, it is an easy matter to collapse this raised support by merely actuating the brace 132 in a clockwise direction, as shown in FIGURE 4, until the brace 132 is positioned between the rod 106 and the rod 130.

In operation, it is merely necessary to drive a motor vehicle upon the rails shown in FIGURE 1. The front rails may be adjusted laterally, either away from each other or towards each other simultaneously by merely actuating one of the rails by the use of the handle or rod 124, the other rail moving equal increments, but in the opposite direction. Likewise, the rear rails may be adjusted laterally by the same rod or handle 124 engaging the aperture 120 in one of the supporting assemblies 100 mounted on the rails 44 and 46. These two rails move simultaneously through equal increments; but in opposite directions by virtue of the link mechanism consisting of members 80, 82 and the gear sectors 86. Each pair of rails may be easily moved laterally by the rod 124 by virtue of the fact that each rail is supported by the two balls 66 resiliently supporting the rails cooperating with the bolts 58, that is, when there is no load on the rails.

When the rails are loaded, as for example, by supporting a motor vehicle, the compression springs 68 yield, transferring the support of the rails to the outer margin of the lower plate 22 and the ledge 30 engaging the arcuate projection or lip 70 of plate member 52. It is to be noted that this arcuate projection is considerably longer than the transverse width of each of the rails, so as to provide a long bearing surface supporting the entire end, or substantially the entire end of each of the rails. When the load is on the rails, the load, so to speak, locks the rails so that they cannot be adjusted laterally and will not shift in spite of stresses that may be applied thereto by virtue of the load.

In this preferred embodiment a single post lift has been used. It may be desirable to have a similar rail arrangement associated with a two post lift. Such an arrangement will now be described.

Referring to the modification disclosed in FIGURE 7, two posts 200 have been used. Each of these posts supports a comparatively heavy steel plate 202 which is held in position by means of suitable bolts 204. These plates 202 have mounted thereon spacer plates 206 and capping plates 208, the plates 208 having a pair of overhanging ledges 210. Rail members 220, 222, 224 and 226 are substantially identical to the rail members 40, 42, 44 and 46, excepting that rail members 220, 222, 224 and 226 have not been provided with the brackets 80 and the link mechanism for interconnecting pairs of rails, in that it is desirable to have the spaces between the rails clear to enable the mechanic to carry on his work without any obstruction throughout the center of the lift. All of the rails 220, 222, 224 and 226 are identical and, that being the case, only one of these rails will be described.

Each rail consists of a plate member 230 and an underlying reinforcing, tapering plate member 232. The top plate member 230 is provided with a comparatively large aperture 240 receiving a bolt 242 passing through a bushing 244 mounted in an aperture in the plate member 232. The bolt 242 threadedly engages the plate member 232, so as to provide a pivotal mounting for the rail, which rail may be swung laterally in a manner substantially identical to that described in connection with the preferred embodiment, excepting that each rail must be adjusted independently of any of the other rails. The upper plate member 230 is provided with an aperture 251 terminating in a shoulder 253, against which a compression spring 255 abuts, this compression spring resting upon a ball bearing 246 mounted in a hole in the lower plate member 232. There are two of these springs and ball bearings for each rail. These ball bearings, together with the springs, cooperate with the pivot or bolt 242 to provide a floating support when the rails are not loaded, in a manner substantially identical to that disclosed in connection with the preferred embodiment.

When the rails are loaded, that is, supporting a motor vehicle, the support of the rails is transferred to a rigid support when the rails rest upon the outer margin of the plate member 202 and the inner end of plate member 232 engages the ledge 210. With this arrangement, the load is released from the bolt 242. In other words, the bolt 242 cooperates with the balls 246 and the spring 255 to provide a floating support; but does not function as a support other than a pivot when supporting the load.

By referring to FIGURE 7, it can readily be seen that the two posts 200 are located outwardly beyond the pivot points of the rails. There are two reasons for this offsetting of the posts. By arranging the posts in this manner with respect to the rails, it will give greater clearance for the mechanic to work between the rails. Furthermore, the posts 200, by being offset, are spaced the same as posts mounted under the rails for supporting the wheels of an automobile or motor vehicle. In other words, the same structure that has been used previously for conventional rails can be rebuilt or modified so as to be used with frame contact rails like those shown in FIGURE 7. By this arrangement, it is possible for a service station having the conventional rails mounted upon two posts, one post for each side of the motor vehicle, to remove the rails and substitute therefor the frame contact rails shown herein. The two rams or posts 200, shown in FIGURE 7, may be mounted on the sides of a motor vehicle or, by a slight modification, one of these may consist of the forward post and the other the rearward post, so that one post raises the forward end of the motor vehicle and the other post raises the rear end of the vehicle.

In the modification disclosed in FIGURES 7 to 10 inclusive, a frame supporting assembly 250 is shown. This frame supporting assembly includes a channel member 252 provided with reentrant flanges 254 engaging the under side of the plate member 230, there being one frame supporting assembly for each of the rails. The channel member 252 is slidable longitudinally on the rails. A suitable stop 256 near the end of each rail limits the endwise movement of the frame supporting assembly upon the rail, in that a lug 258 welded to the under side of the reentrant flange 254 is adapted to engage the downwardly projecting stud or stop 256. Studs 260 are secured to the flanges 262 of the channel 252. These studs 260 provide pivots for flanges 270 integral with a channel member 272. The flanges project downwardly beyond the bottom of the channel member 272 in such a manner that the channel member 272 may be seated on top of the channel member 252 when in the flat or downward position, as shown in full lines in FIGURE 9 and as shown in FIGURE 7. The channel member 272 may be raised upwardly, as shown by the arrows to the right of FIGURE 9, from the full line position to the dot-dash position shown in this figure. The lower edge 280 of the bottom of the channel member 272 rests upon the channel member 252, so that the channel member 272, when raised into the dotted position, as shown in FIGURE 9, and to the full line position shown in FIGURE 10, provides a support for the frame of the motor vehicle.

Brackets 282 have been welded to the lower portion of the flanges 270, as shown in FIGURE 10, to reinforce the flanges 270. A rubber pad 112, identical to that shown in connection with the preferred embodiment, is superimposed upon the channel member 272. Suitable holes 284 have been provided for the reception of the rod or handle 124 to raise or lower the channel member 272 from the raised position to the flat position, or vice versa. The same hole 284 and the handle or rod 124 may be used in adjusting the rails laterally and in adjusting the frame support assembly longitudinally on the rails.

In FIGURE 11, the lift assembly, using reference numerals on like parts the same as in FIGURE 1, differs from the lift assembly disclosed in FIGURE 1 only by omitting parts 80 to 90 inclusive, whereby the rails are each independently swingable.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A motor vehicle lift assembly including hydraulic lifting means, frame means, two pairs of rails pivotally mounted on the frame means, one pair for the forward end of the motor vehicle and one pair for the rear end of the motor vehicle, floating means for supporting each of the rails upon the frame, said floating means including a pivot pin, a plurality of roller bearings, springs mounted between the roller bearings and the rails so that when there is no load supported by the rails the rails are supported upon the roller bearings and the pivot pin, the roller bearings functioning as a fulcrum for their rail, and a rigid support including a fixed fulcrum nearer the load than the roller bearings and a second fulcrum including a supporting plate member overlying the pivoted ends of the rails, said second fulcrum being further removed from the load than the pivot pin so as to provide a rigid lever-like support for the load.

2. A motor vehicle lift assembly including a single post hydraulic lifting means, a frame including two pairs of pivotally mounted rails, one pair for the forward end of the motor vehicle and one for the rear end of the motor vehicle, floating mounting means for supporting the rails without a load thereon, said floating mounting means including spring urged ball bearings seated in apertures in the under side of the rails, said apertures having a larger diameter than the ball bearings so as to permit limited movement of the rails before the ball bearings engage the sides of the apertures, the rails of each pair being pivotally mounted on pivots spaced apart so that the rails are spaced apart, a plate overlying the pivoted ends of the rails to provide a fulcrum for the rails, means for adjusting the rails in each pair in unison but in opposite directions, said means including a pair of intermeshing gear sectors, and link members for connecting the gear sectors to the rails, said link members and gear sectors spanning the distance between each pair of rails.

3. A motor vehicle lift assembly including hydraulic lifting means, a plurality of rails pivotally mounted on the frame means, floating means for supporting each of the rails upon the frame, said floating means including a pivot pin, a plurality of roller bearings, springs mounted between the roller bearings and the rails so that when there is no load supported by the rails the rails are supported upon the roller bearings and the pivot pin, the roller bearings functioning as a fulcrum for their rail, and a rigid support including a fixed fulcrum nearer the load than the roller bearings and a second fulcrum including a supporting plate member overlying the pivoted ends of the rails, said second fulcrum being further removed from the load than the pivot pin so as to provide a rigid lever-like support for the load.

4. A motor vehicle lift assembly including hydraulic lifting means, frame means, a pair of rails pivotally mounted on the frame means for supporting one end of a motor vehicle, floating means for supporting each of the rails upon the frame, said floating means including a pair of pivot pins, one for each rail, a plurality of roller bearings, resilient means mounted between the roller bearings and rails so that when there is no load supported by the rails the rails are supported upon the roller bearings and the pivot pins, the roller bearings functioning as fulcrums for the rails, and a rigid support including a fixed fulcrum nearer the load than the roller bearings of each rail, and a pair of fulcrum members overlying the pivoted ends of the rails, said fulcrum members being further removed from the load than the pivot pins so as to provide a rigid lever-like support for the load.

5. A motor vehicle lift assembly including lifting means, frame means, a plurality of rails pivotally mounted on the frame means for supporting one end of a motor vehicle, a plurality of pivot pins, one for each of the rails, said pivot pins forming a pivot about which the rails are pivotally mounted to the frame, resilient fulcrum means interposed between the frame means and the rails cooperating with the pivot pins to support the rails out of contact with the frame means when there is no load supported by the rails, and a rigid support including a fulcrum near the load than the resilient fulcrum means, and fulcrum members overlying the pivoted ends of the rails, there being one fulcrum member for each rail, the fulcrum members being further removed from the load than the pivot pins so as to provide a rigid lever-like support for the load.

References Cited in the file of this patent

UNITED STATES PATENTS 2,878,897   Cochin _____ Mar. 25, 1959

FOREIGN PATENTS 497,847   Belgium _____ Sept. 15, 1950
182,213   Austria _____ June 10, 1955